United States Patent
Ayed et al.

(10) Patent No.: US 9,064,307 B2
(45) Date of Patent: Jun. 23, 2015

(54) METHODS AND APPARATUS TO GENERATE THREE-DIMENSIONAL SPINAL RENDERINGS

(71) Applicant: General Electric Company, Schenectady, NY (US)

(72) Inventors: Ismail Ben Ayed, London (CA); Kumaradevan Punithakumar, London (CA); Seyed-Parsa Hojjat, London (CA); Gregory Garvin, London (CA)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 13/930,983

(22) Filed: Jun. 28, 2013

(65) Prior Publication Data

US 2015/0003695 A1    Jan. 1, 2015

(51) Int. Cl.
*G06K 9/00* (2006.01)
*G06T 7/00* (2006.01)
*A61B 5/00* (2006.01)

(52) U.S. Cl.
CPC .................................. *G06T 7/0014* (2013.01)

(58) Field of Classification Search
USPC ......... 382/100, 103, 106, 128–134, 154, 162, 382/168, 173, 181, 209, 232, 254, 276, 285, 382/291, 305, 312; 600/407, 340; 424/1.11; 378/6, 20, 21
See application file for complete search history.

(56) References Cited

U.S. PATENT DOCUMENTS

| | | | |
|---|---|---|---|
| 6,249,590 B1 | 6/2001 | Young et al. | |
| 6,608,917 B1 | 8/2003 | Wei et al. | |
| 7,233,330 B2 | 6/2007 | Moreau-Gobard et al. | |
| 7,561,728 B2 | 7/2009 | Abufadel et al. | |
| 7,787,678 B2 | 8/2010 | Unal et al. | |
| 7,804,986 B2 | 9/2010 | Lai et al. | |
| 7,903,851 B2 | 3/2011 | Reisman et al. | |
| 8,014,575 B2 | 9/2011 | Weiss et al. | |
| 8,571,282 B2 | 10/2013 | Davydov | |
| 8,965,083 B2 | 2/2015 | Ben Ayed et al. | |
| 2002/0115944 A1 | 8/2002 | Mendes et al. | |
| 2005/0020942 A1 | 1/2005 | Wada et al. | |
| 2006/0074431 A1 | 4/2006 | Sutton et al. | |
| 2006/0251302 A1 | 11/2006 | Abufadel et al. | |
| 2007/0173744 A1 | 7/2007 | Lai et al. | |
| 2008/0044074 A1* | 2/2008 | Jerebko et al. ................. 382/128 |
| 2008/0132784 A1 | 6/2008 | Porat et al. | |
| 2009/0281572 A1 | 11/2009 | White | |

(Continued)

OTHER PUBLICATIONS

Ayed et al., "Graph Cuts with Invariant Object-Interaction Priors: Application to Intervertebral Disc Segmentation," Information Processing in Medical Imaging 2011 (IPMI 2011), LNCS 6801, Jun. 2011, 12 pages.

(Continued)

*Primary Examiner* — Seyed Azarian
(74) *Attorney, Agent, or Firm* — Hanley, Flight & Zimmerman, LLC

(57) ABSTRACT

Methods and apparatus are disclosed to methods and apparatus to generate three-dimensional spinal renderings. An example computer-implemented method includes receiving initial user input identifying a vertebra on a spinal image. In response to receiving the initial user input, simultaneously detecting inter-vertebral discs and vertebral bodies. The computer-implemented method includes displaying the detected inter-vertebral discs and vertebral bodies.

17 Claims, 6 Drawing Sheets

(56) References Cited

U.S. PATENT DOCUMENTS

| | | | |
|---|---|---|---|
| 2010/0094427 | A1 | 4/2010 | Bertagnoli |
| 2011/0058720 | A1 | 3/2011 | Lu et al. |
| 2011/0130653 | A1 | 6/2011 | Wang |
| 2011/0225530 | A1 | 9/2011 | Osmundson et al. |
| 2011/0230915 | A1 | 9/2011 | Anderson et al. |
| 2011/0249876 | A1* | 10/2011 | Dewaele .................... 382/128 |
| 2012/0020538 | A1* | 1/2012 | Weiss ....................... 382/131 |
| 2013/0230454 | A1* | 9/2013 | Gardner et al. ............. 424/1.11 |
| 2014/0003684 | A1 | 1/2014 | Ayed et al. |
| 2014/0323845 | A1* | 10/2014 | Forsberg .................... 600/407 |

OTHER PUBLICATIONS

Myronenko et al, "Non-Rigid Point Set Registration: Coherent Point Drift," Advances in Neural Information Processing Systems, 2006, 8 pages.

United States Patent and Trademark Office, "Office Action," issued in connection with U.S. Appl. No. 13/535,900, mailed on May 13, 2014, 34 pages.

United States Patent and Trademark Office, "Notice of Allowance," issued in connection with U.S. Appl. No. 13/535,900, mailed on Oct. 10, 2014, 20 pages.

Mitiche et al., "Variational and Level Set Methods in Image Segmentation," 1st Edition, Springer, Jun. 17, 2010, 196 pages.

Fardon et al. "Nomenclature and Classification of Lumbar Disc Pathology, Recommendations of the Combined Task Forces of the North American Spine Society, American Society of Spine Radiology, and American Society of Neuroradiology," SPINE, vol. 26, No. 5, pp. E93-E113, 2001, 21 pages.

Ayed et al., "Vertebral Body Segmentation in MRI via Convex Relaxation and Distribution Matching," Medical Image Computing and Computer Assisted Intervention (MICCAI), 2012, 8 pages.

Yuan et al., "A Study on Continuous Max-Flow and Min-Cut Approaches," CVPR, 2010, 22 pages.

\* cited by examiner

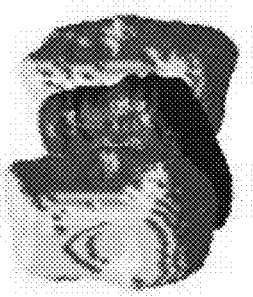
FIG. 7
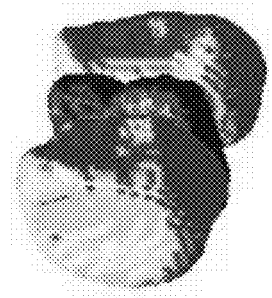
FIG. 8
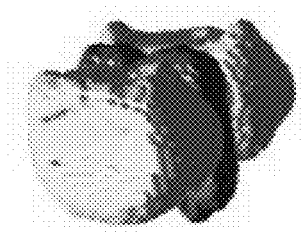
FIG. 9
FIG. 10

METHODS AND APPARATUS TO GENERATE THREE-DIMENSIONAL SPINAL RENDERINGS

FIELD OF THE DISCLOSURE

This disclosure relates generally to generating three-dimensional spinal renderings, and, more particularly, to methods and apparatus to generate three-dimensional spinal renderings.

BACKGROUND

Spinal images may be obtained and used to diagnosis various spinal disorders such as displacements of inter-vertebral discs (IVD) beyond the limits defined by vertebral body (VB) end-plates and outer edges of vertebral ring apophyses. Some spinal displacements include protrusions and bulging. In some examples, protrusions relate to the localized displacement of inter-vertebral discs (IVD) and bulging relates to a generalized displacement of the IVDs. In some examples, the term "localized" means that the deformity is less than 50% (less than 180 degrees) of a circumference of a disc and the term "generalized" means that the deformity involves more than 50% (greater than 180 degrees) of the circumference of the disc.

BRIEF DESCRIPTION OF THE DRAWINGS

FIGS. 4-10 are 3D spinal radiology images in accordance with the teachings of this disclosure generated by the example system of FIG. 1.

To clarify multiple layers and regions, the thickness of the layers are enlarged in the drawings. Wherever possible, the same reference numbers will be used throughout the drawing(s) and accompanying written description to refer to the same or like parts.

DETAILED DESCRIPTION

Spinal images may be reviewed when diagnosing and/or following-up on inter-vertebral disc (IVD) displacements. However, current approaches are relatively expensive, tedious, time-consuming and subject to high inter-observer variabilities. For example, radiologists may perform repetitive visual inspections of several images (e.g., axial and sagittal plans) to create a mental picture regarding the IVD displacements and/or manually measure and input measurements to determine the size and/or evolution over time of the IVD displacements.

The examples disclosed herein relate to automatically detecting IVD/VB surfaces and/or generating three-dimensional (3D) spinal renderings. To overcome some of the deficiencies encountered with some known approaches, the examples disclosed herein automatically detect and/or provide three-dimensional (3D) visualizations of the IVD displacements beyond the limits defined by the VBs. Additionally or alternatively, the examples disclosed herein provide quantitative and/or reproducible measures of the size and evolution over time of the IVD displacements, thereby significantly reducing the amount of time spent in generating such models as compared to current practices. In some examples, the example system uses contextual information about the IVDs/VBs and their neighboring structures to detect and/or visualize the IVD displacements.

In some examples, instead of using individual pixel values to detect and/or identify IVD/VB surfaces, the examples disclosed herein use several image statistics (e.g., mean) within several box-shaped image patches having different orientations and/or scales. Using such patch-based features identifies and/or encodes contextual knowledge about the region of interests (e.g., size, shape, orientation, etc.) and/or their neighboring structures (e.g., relationships to neighboring structures) to overcoming some of the difficulties associated with spine MRI images (e.g., low contrast, high noise level and/or significant similarities between pixel values within the VBs and the IVDs).

Figure 1:
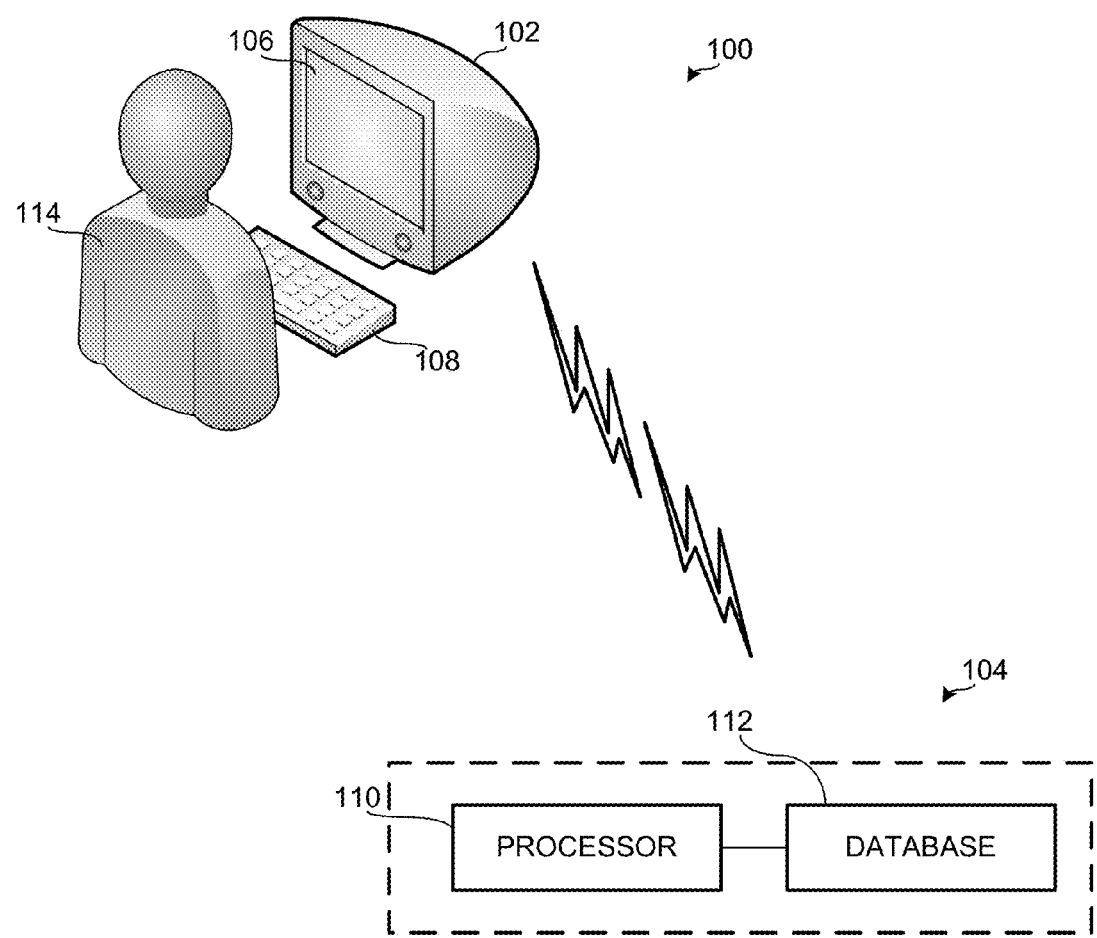
FIG. 1 is a schematic illustration of an example system to generate 3D spinal renderings.

FIG. 1 depicts an example system 100 for automatically detecting and displaying 3D surfaces of IVDs and VBs and enabling the size and/or evolution over time of IVD displacements to be quantitatively measured and/or reproduced. In some examples, the system 100 includes a computer 102 and a generator 104 communicatively coupled to the computer 102. In this example, the computer 102 includes a user interface 106 and a data input (e.g., a keyboard, mouse, microphone, etc.) 108 and the generator 104 includes a processor 110 and a database or other data store 112.

In some examples, the user interface 106 displays data such as images (e.g., spinal images, radiology images, lumbar spine images, etc.) received from the generator 104. In some examples, the user interface 106 receives commands and/or input from a user 114 via the data input 108. For example, in examples in which the system 100 is used to generate 3D spinal renderings, the user interface 106 displays a spinal image(s) and the user 114 provides an initial input identifying, for example, a location of a vertebra on the spinal image(s). In some examples, the initial user input includes selecting three points on a vertebra on the displayed spinal image.

In some examples, the initial user input may be used by the generator 104 to automatically detect and visualize vertebral-body surfaces using 3D distribution matching and/or interpolate discs in two-dimensional (2D) sagittal images. Additionally or alternatively, the generator 104 may use the initial user input to refine curve evolution of disc boundaries in 2D sagittal images and/or reconstruct smooth surfaces of the discs.

Figure 2:
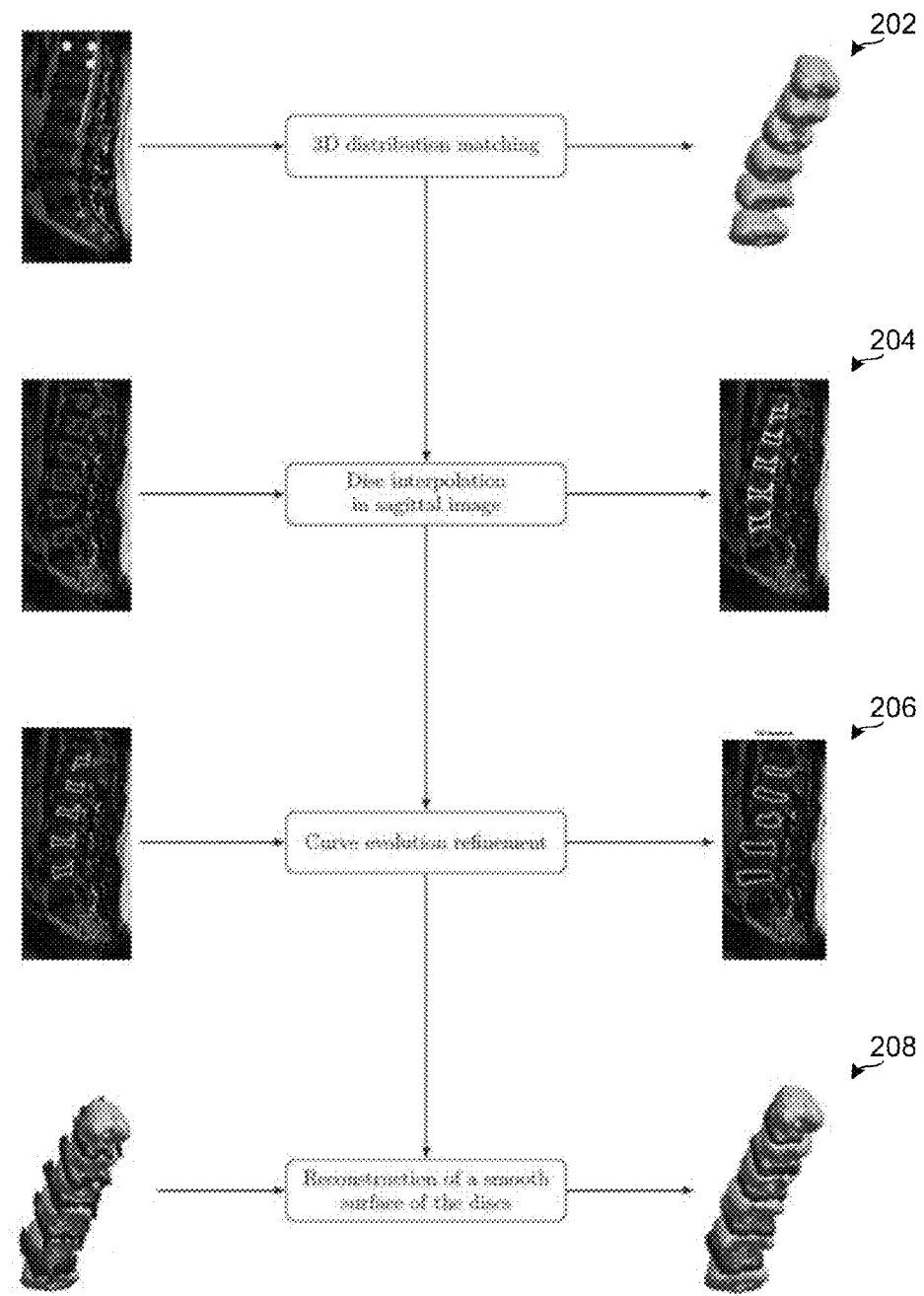
FIG. 2 is a flow diagram representative of machine readable instructions that may be executed to implement the system of FIG. 1.
Figure 6:
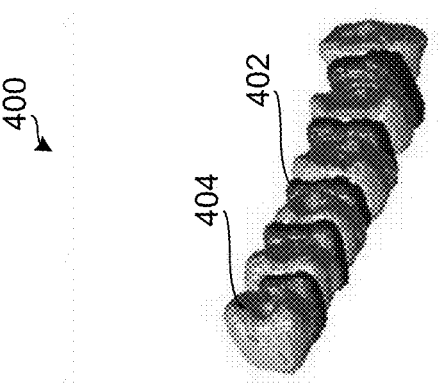
Figure 5:
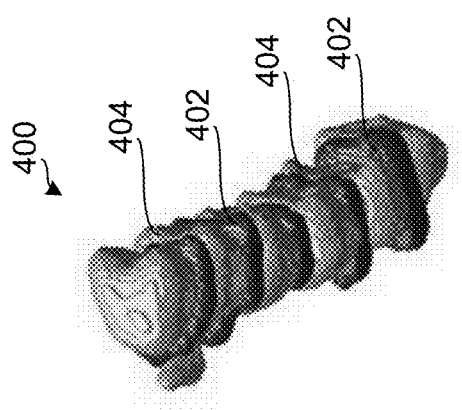
Figure 4:
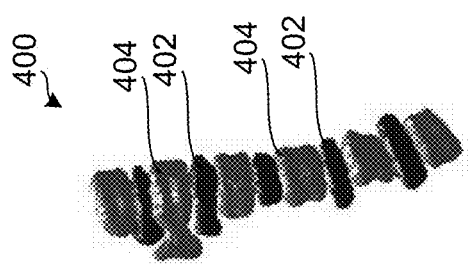

In some examples, the generator 104 automatically detects and visualizes vertebral-body surfaces using 3D distribution matching and/or contextual information about the IVDs/VBs, neighboring structures and/or advanced optimization and/or statistical modeling techniques. In some examples, the generator 104 automatically detects and visualizes the vertebral-body surfaces by building contextual-information features, statistical modeling of the contextual information within the vertebral bodies and/or finding the 3D surfaces of all regions whose contextual features are consistent with the statistical model, M (FIG. 2, 202).

In some examples, the contextual-information features are generated and/or built by generating a feature vector, F(x), for each voxel point, x, in the 3D image domain, $\Omega \subset \mathbb{R}^3$. For example, for each voxel point, x, a 3-dimensional feature vector, $F(x)=(F_1, F_2, F_3)$, may be built, where $F_1$, is the mean intensity within a 21×7×1 rectangularly-shaped, vertically-oriented patch, $F_2$ is the mean intensity within a 7×21×1 rectangular-shaped, horizontally-orientated patch and $F_3$ is the mean intensity within a 7×7×1 square-shaped patch centered at point, x. Additionally or alternatively, other features based on image gradients and/or textures may be used within the same, similar and/or different framework.

In some examples, the contextual information within the vertebral bodies may be statistically modeled by building a multi-dimensional model distribution using all the feature vectors, F(x), within a rectangular approximation of one VB in a single 2D mid-sagittal slice of the series. In some examples, the approximation is automatically computed from the user input (e.g., the three points selected on the vertebra displayed). In some examples, the muti-dimensional model, M, is determined and/or computed using Equation 1, where R is the region corresponding to the rectangular approximation of one VB, Z is the set of values of features vectors, F, and the Gaussian kernel, K, is determined using Equation 2, where $\sigma$ is a constant measure of the width of the kernel. In some examples, Equation 1 is the kernel density estimate of the distribution of features, F, within the rectangular approximation, R.

$$M(z) = \frac{\sum_R K(F(x) - z)}{\sum_R 1} \forall z \in Z \quad \text{Equation 1}$$

$$K(y) = \frac{1}{(2\pi\sigma^2)^{\frac{k}{2}}} \exp{-\frac{\|y\|^2}{2\sigma^2}} \quad \text{Equation 2}$$

In some examples, the 3D surfaces of substantially all regions having contextual features that are consistent with the statistical model, M, are identified and/or determined by optimizing a cost function and/or problem, Equation 3, containing two constraints. In this example, the first constraint is based on a Bhattacharyya measure of similarity between feature distributions. In some examples, the first constraint substantially ensures the obtained and/or identified spinal regions are consistent with the statistical model, M. In this example, the second constraint is a smoothness constraint that removes small and/or isolated regions caused by imaging noise. In this example, the second constraint substantially ensures that the surfaces are smooth.

Referring to Equation 3, u: $\Omega \to \{0, 1\}$ is a binary indicator function that defines a variable partition of the 3D image domain $\Omega \subset \mathbb{R}^3$, $\{x \in \Omega / u(x)=1\}$, which corresponds to a target region and $\{x \in \Omega / u(x)=0\}$ that corresponds to the complement of the target region in $\Omega$. Again referring to Equation 3, $P_u$, which is described in Equation 4, is the kernel density estimate of the distribution of features, F, within the target region, $\{x \in \Omega / u(x)=1\}$, where the Z is the set of values of the feature vector, F, and K is the Gaussian kernel given by Equation 2.

$$\min_{u \in [o,1]} E(u) = -\sum_{z \in Z} \sqrt{P_u(z) M(z)} + \lambda \int_\Omega |\nabla u(x)| dx \quad \text{Equation 3}$$

$$P_u(z) = \frac{\sum_\Omega u(x) K(F(x) - z)}{\sum_\Omega u(x)} \forall z \in Z \quad \text{Equation 4}$$

In some examples, the results of the processing at this stage are shown at reference number 202 (FIG. 202).

In some examples, the generator 104 interpolates discs in 2D sagittal images by projecting the obtained 3D surfaces onto the 2D sagittal images to obtain 2D vertebra boundaries within each image of the sagittal series. Additionally and/or alternatively, the generator 104 interpolates discs in the 2D sagittal images by determining and/or computing a convex-hull approximation of the regions between each of the two adjacent vertebrae to obtain an initial approximation of the inter-vertebral discs. In some examples, the results of the processing at this stage are shown at reference number 204 (FIG. 202).

In some examples, the generator 104 refines the curve evolution of the disc boundaries determined using a curve evolution algorithm, represented by Equation 3, which automatically moves the disc boundaries by attracting the boundaries to high contrasts (e.g., absolute differences in pixel values) and/or ensuring the boundaries are smooth. In some examples, a closed parametric curve, $\Gamma(s)$: $[0,1] \to \Omega_i$, is defined from $[0,1]$ to the image domain of a sagittal slice i: $l_i$: $\Omega_i \subset \mathbb{R}^2$. In some examples, Equation 7 below attracts and/or urges an active curve, $\Gamma(s)$, toward high transitions (significant edges) of a given sagittal image, $l_i$: $\Omega_i \subset \mathbb{R}^2$, by minimizing Equation 5, where g is an edge function indicator represented by Equation 6.

$$G(\Gamma) = \int_\Gamma g(l_i) ds \quad \text{Equation 5}$$

$$g(l_i) = \frac{1}{1 + \|\nabla l_i\|} \quad \text{Equation 6}$$

In some examples, the curve evolution algorithm, represented in Equations 5, 7 and 8 is obtained by minimizing G (F) with respect to F by deriving an Euler-Lagrange gradient descent equation by embedding the curve, F, in a one-parameter family of curves, $\Gamma(s, t)$: $[0,1] \times \mathbb{R}+ \to \Omega_i$, and solving a partial differential descent equation, Equation 7. Referring to Equation 7, t, is an artificial time parameterizing the descent direction and $$\frac{\partial G}{\partial \Gamma},$$

which is described in Equation 8, identifies the functional derivative of G with respect to $\Gamma$, where $\vec{n}$ is the inward unit normal to $\Gamma$ and k is the mean curvature function of $\Gamma$.

$$\frac{\partial \Gamma}{\partial t} = -\frac{\partial G}{\partial \Gamma} \quad \text{Equation 7}$$

$$\frac{\partial G}{\partial \Gamma} = (-gk + \langle \nabla g, \vec{n} \rangle \vec{n} s) \quad \text{Equation 8}$$

In some examples, the results of the processing at this stage are shown at reference number 206 (FIG. 202).

In some examples, the generator 104 reconstructs smooth surfaces from the disc boundaries by optimizing an energy function having two constraints. In some examples, the first constraint enforces and/or enables surface smoothness. In some examples, the second constraint enforces and/or enables the surfaces to be consistent with the boundaries determined when the generator 104 refined the disc boundaries, as described above.

Referring to Equation 9, u: $\Omega \rightarrow \{0,1\}$ is a binary indicator function that defines the disc regions determined above, where $D(x)=1$, if the voxel, x, is associated with a disc regions and $D(x)=0$, otherwise. Again referring to Equation 9, u: $\Omega \rightarrow \{0,1\}$ is a binary indicator function that defines a variable partition of the 3D image domain, $\Omega \subset \mathbb{R}^3$, $\{x \epsilon \Omega / u(x)=1\}$, which corresponds to a target region and $\{x \epsilon \Omega / u(x)=0\}$ corresponds to the complement of the target region in $\Omega$.

$$\min_{u \epsilon \{0,1\}} K(u) = \int_{\Omega} (D-1)^2 u + D^2 (1-u) dx + \lambda \int_{\Omega} |\nabla u(x)| dx \quad \text{Equation 9:}$$

Figure 3:
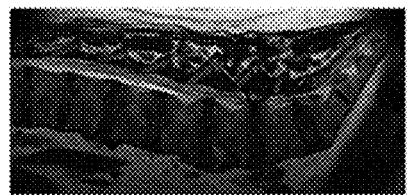
FIG. 3 is an example mid-sagittal image of a magnetic resonance (MR) series.

FIGS. 3-10 depict results obtained using the examples disclosed herein where reference number 402 corresponds to IVDs and reference number 404 corresponds to VBs. FIG. 3 shows a mid-sagittal image of a MR series where the size of the series (e.g., the volume) is 320×150×80 voxels. FIGS. 3-6 depict different views of a whole lumber spine 406 (e.g., from T12 to the L5 vertebra). FIGS. 7 and 8 depict different views of L4-L5 structures (e.g., vertebrae and disc). FIGS. 9 and 10 depict different views of L3-L4 structures (e.g., vertebrae and disc).

Figure 11:
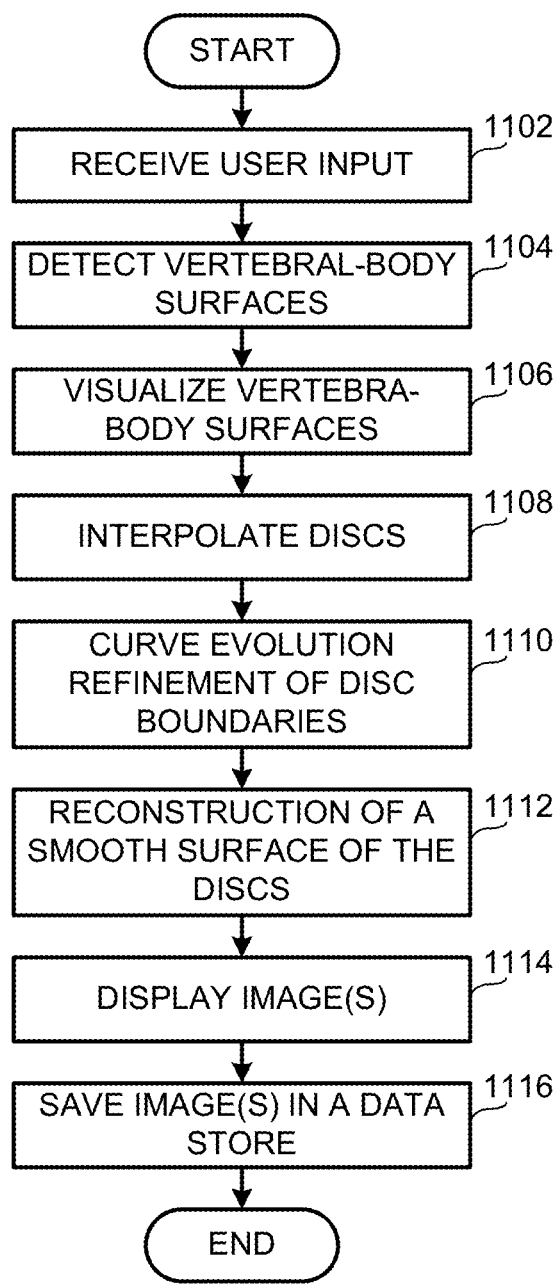
FIG. 11 is a flowchart representative of machine readable instructions that may be executed to implement the system of FIG. 1.

FIG. 11 depicts a manner of implementing the system 100 of FIG. 1. While an example manner of implementing the system of FIG. 1 has been illustrated in FIG. 11, one or more of the elements, processes and/or devices illustrated in FIG. 11 may be combined, divided, re-arranged, omitted, eliminated and/or implemented in any other way. Further, the example generator 104, the example processor 110, the example computer 102 and/or, more generally, the example flowchart of FIG. 11 may be implemented by hardware, software, firmware and/or any combination of hardware, software and/or firmware. Thus, for example, any of the example generator 104, the example processor 110, the example computer 102 and/or, more generally, the example flowchart of FIG. 11 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example generator 104, the example processor 110 and/or the example computer 102 are hereby expressly defined to include a tangible computer readable medium such as a memory, DVD, CD, Blu-ray, etc. storing the software and/or firmware. Further still, the example flowchart of FIG. 11 may include one or more elements, processes and/or devices in addition to, or instead of, those illustrated in FIG. 11, and/or may include more than one of any or all of the illustrated elements, processes and devices.

A flowchart representative of example machine readable instructions for implementing the system 100 of FIG. 1 is shown in FIG. 11. In this example, the machine readable instructions comprise a program for execution by a processor such as the processor 1212 shown in the example computer 1200 discussed below in connection with FIG. 12. The program may be embodied in software stored on a tangible computer readable medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 11, many other methods of implementing the example system 100 may alternatively be used. For example, the order of execution of the blocks may be changed, and/or some of the blocks described may be changed, eliminated, or combined.

As mentioned above, the example processes of FIG. 11 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 11 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program of FIG. 11 begins at block 1102 where the computer 102 receives, via the data input 108, input on a spine image displayed at the user interface 106 and/or stored in the data base 112 (block 1102). In some examples, the initial input is associated with the user 114 clicking on and/or selecting three points on a vertebra of the displayed spinal image and/or selecting three-points of a 3D volume.

In some examples, the user input identifying the 3D volume, a spinal feature and/or vertebra assists in and/or enables the example algorithm and/or the generator 104 to detect and visualize vertebra-body surfaces using, for example, contextual information about the IVDs/VBs, neighboring structures and/or advanced optimization and/or statistical modeling techniques (blocks 1104, 1106). Additionally and/or alternatively, in some examples, the generator 104 detects and visualizes the vertebral surfaces by building contextual information features, statistical modeling the contextual information within the vertebral bodies and/or finding the 3D surfaces of regions whose contextual features are consistent within the statistical model, M. In some examples, reference number 202 (FIG. 202) depicts the results of the processing performed at blocks 1104 and/or 1106.

At block 1108, the generator 104 interpolates discs in 2D sagittal images by projecting the determined 3D surfaces onto the 2D sagittal images and determining a convex-hull approximation of the regions between each adjacent vertebrae (block 1108, FIG. 2, 204). At block 1100, the generator 104 refines the determined disc boundaries by attracting the boundaries to high contrasts and/or ensuring the boundaries are smooth (block 1110, FIG. 2, 206). At block 1112, the generator 104 reconstructs the disc boundaries to have smooth surfaces by optimizing an energy function having constraints that enforce surface smoothness and ensure that the surfaces are consistent with the boundaries previously determined (block 1112, FIG. 2, 208). At block 1114, the spinal rendering generated is displayed for user review and/or saved in the data base 112 (blocks 1114, 1116).

Figure 12:
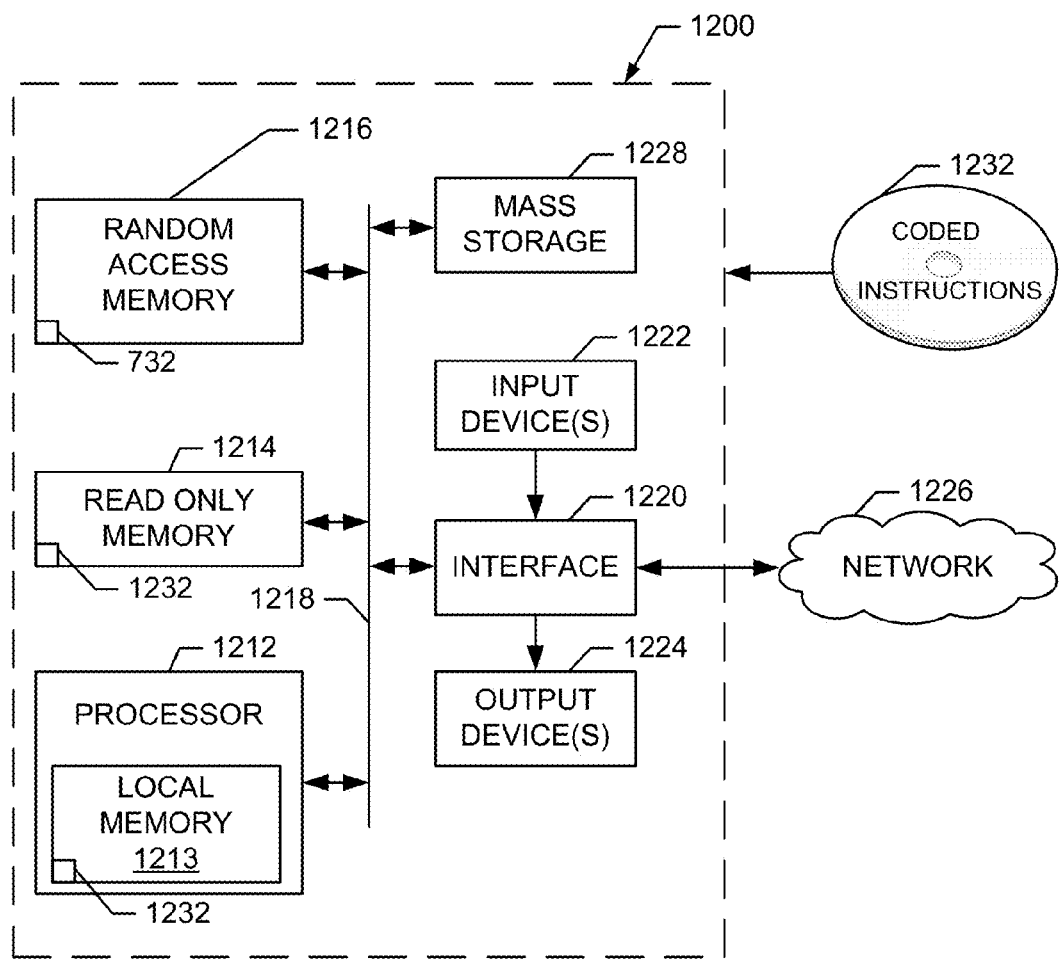
FIG. 12 is a processor platform to execute the instructions of FIG. 11 to implement the system of FIG. 1.

FIG. 12 is a block diagram of an example computer 1200 capable of executing the instructions of FIG. 11 to implement the system 100 of FIG. 1. The computer 1200 can be, for example, a server, a personal computer, a mobile phone (e.g., a cell phone), a personal digital assistant (PDA), an Internet appliance, or any other type of computing device.

The system 1200 of the instant example includes a processor 1212. For example, the processor 1012 can be implemented by one or more microprocessors or controllers from any desired family or manufacturer.

The processor 1212 includes a local memory 1213 (e.g., a cache) and is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The computer 1200 also includes an interface circuit 1220. The interface circuit 1220 may be implemented by any type of interface standard, such as an Ethernet interface, a universal serial bus (USB), and/or a PCI express interface.

One or more input devices 1222 are connected to the interface circuit 1220. The input device(s) 1222 permit a user to enter data and commands into the processor 1212. The input device(s) can be implemented by, for example, a keyboard, a mouse, a touchscreen, a track-pad, a trackball, etc.

One or more output devices 1224 are also connected to the interface circuit 1220. The output devices 1224 can be implemented, for example, by display devices (e.g., a liquid crystal display, a cathode ray tube display (CRT), a printer and/or speakers). The interface circuit 1220, thus, typically includes a graphics driver card.

The interface circuit 1220 also includes a communication device such as a modem or network interface card to facilitate exchange of data with external computers via a network 1226 (e.g., an Ethernet connection, a digital subscriber line (DSL), a telephone line, coaxial cable, a cellular telephone system, etc.).

The computer 1200 also includes one or more mass storage devices 1228 for storing software and data. Examples of such mass storage devices 1228 include floppy disk drives, hard drive disks, compact disk drives and digital versatile disk (DVD) drives. The mass storage device 1228 may implement the database 112.

The coded instructions 1232 of FIG. 11 may be stored in the mass storage device 1228, in the volatile memory 1214, in the non-volatile memory 1216, and/or on a removable storage medium such as a CD or DVD.

From the foregoing, it will be appreciated that the above disclosed methods and apparatus provide an example system that identifies and/or differentiates between IVD/VB surfaces even though the IVD/VB surfaces may not well defined by high contrasts, the IVD/VB surfaces have substantially similar intensity and/or strong imaging noise can occur within the VBs. In some examples, the example system provides a user-friendly visualization of IVD displacements beyond the limits defined by the VBs by automatically detecting the 3D surfaces of both the IVDs and VBs and/or substantially simultaneously and/or simultaneously displaying the IVD and/or VB surfaces using different views, colors and/or differentiators (e.g., cross-hatchings). In some examples, the example system enables quantitative and/or reproducible measures of the size and/or evolution of the IVD displacements over time. In some examples, the examples disclosed herein automatically detect and simultaneously visualize 3D surfaces of vertebral bodies and intervertebral discs. In some examples, the examples disclosed herein automatically measure displacements of the inter-vertebral discs beyond limits defined by the vertebral bodies (e.g., protrusion).

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A computer-implemented method, comprising:
automatically detecting three-dimensional visualizations of inter-vertebral discs beyond a limit defined by a vertebral body;
displaying an inter-vertebral disc displacement based on the detected three-dimensional visualizations; and
reproducibly measuring the inter-vertebral disc displacement over time, wherein the three-dimensional visualizations are detected based on image statistics within a plurality of image patches.

2. The computer-implemented method of claim 1, further comprising determining an evolution of the inter-vertebral disc displacement over time based on the detected three-dimensional visualizations.

3. The computer-implemented method of claim 1, wherein the image patches comprise box-shaped image patches having different orientations or scales.

4. The computer-implemented method of claim 1, wherein the image patches comprise information associated with a region of interest or a neighboring structure.

5. The computer-implemented method of claim 1, wherein reproducibly measuring comprises quantitatively reproducibly measuring.

6. The computer-implemented method of claim 1, wherein, in response to receiving initial user input, automatically detecting the three-dimensional visualizations of inter-vertebral discs.

7. The method of claim 6, wherein the initial user input comprises identifying a vertebra on a spinal image.

8. A computer-implemented method, comprising:
receiving initial user input identifying a vertebra on a spinal image;
in response to receiving the initial user input, detecting inter-vertebral discs and vertebral bodies; and
displaying the detected inter-vertebral discs and vertebral bodies, wherein three-dimensional visualizations of intervertebral discs are detected based on image statistics within a plurality of image patches.

9. The computer-implemented method of claim 8, further comprising automatically detecting the three-dimensional visualizations of inter-vertebral discs beyond a limit defined the vertebral bodies.

10. The computer-implemented method of claim 9, further comprising determining an evolution of the inter-vertebral disc displacement over time based on the detected three-dimensional visualizations.

11. The computer-implemented method of claim 9, wherein the three-dimensional visualizations are detected using three-dimensional distribution matching.

12. The computer-implemented method of claim 8, further comprising reproducibly measuring the inter-vertebral disc displacement over time.

13. The computer-implemented method of claim 8, wherein the initial user input is used to visualize vertebral body surfaces, interpolate the inter-vertebral discs, refine curve evolution of disc boundaries, or reconstruct smooth surfaces of the inter-vertebral discs.

14. The computer-implemented method of claim 8, wherein the inter-vertebral discs and vertebral bodies are detected by generating contextual-information features or statistical modeling.

15. The computer-implemented method of claim 14, wherein the contextual-information features are generated by generating a feature vector for each voxel point in a three-dimensional image domain.

16. A system, comprising:
a processor, wherein in response to receiving a user input via a data input identifying a vertebra on a spinal image, the processor is to detect inter-vertebral discs and vertebral bodies;
and the processor is to cause the inter-vertebral discs and the vertebral bodies to be displayed at a user interface, the processor is to automatically detect three-dimensional visualizations of inter-vertebral discs beyond a limit defined by a vertebral body, wherein the three-dimensional visualizations of intervertebral discs are detected based on image statistics within a plurality of image patches.

17. The system of claim 16, further comprising reproducibly measuring the inter-vertebral disc displacement over time.

* * * * *